US012676726B2

(12) United States Patent　　　　(10) Patent No.:　US 12,676,726 B2

Almoneef et al.　　　　　　　　　(45) Date of Patent:　　　Jul. 7, 2026

(54) FANO BASED TIME DIVISION DUPLEXING SWITCH

(71) Applicant: Prince Sattam Bin Abdulaziz University (PSAU), Al Kharj (SA)

(72) Inventors: Thamer Almoneef, Al Kharj (SA); Abdullah Aljanah, Al Kharj (SA); Omar Siddiqui, Madinah (SA); Mian Wahaj Anwar, Islamabad (PK); Muhammad Rashad Ramzan, Islamabad (PK)

(73) Assignee: Prince Sattam Bin Abdulaziz University (PSAU), Al Kharj (SA)

( * ) Notice: Subject to any disclaimer, the term of this patent is extended or adjusted under 35 U.S.C. 154(b) by 325 days.

(21) Appl. No.: 18/415,552

(22) Filed: Jan. 17, 2024

(65) Prior Publication Data

US 2025/0233723 A1　　　Jul. 17, 2025

(51) Int. Cl.
　　*H04L 5/14*　　　　(2006.01)
　　*H01P 7/00*　　　　(2006.01)
　　*H04B 1/48*　　　　(2006.01)

(52) U.S. Cl.
　　CPC .............. *H04L 5/1461* (2013.01); *H01P 7/00* (2013.01); *H04B 1/48* (2013.01)

(58) Field of Classification Search
　　CPC ........... H04L 5/1461; H01P 7/00; H04B 1/48
　　See application file for complete search history.

(56) References Cited

U.S. PATENT DOCUMENTS

| | | | | |
|---|---|---|---|---|
| 2002/0158719 A1* | 10/2002 | Liang | .................. | H01P 1/20381 333/204 |
| 2011/0279176 A1* | 11/2011 | Oran | ................... | H01P 1/20336 333/132 |
| 2014/0232482 A1* | 8/2014 | Wada | .................. | H01P 1/20381 333/204 |
| 2022/0123453 A1* | 4/2022 | Ramzan | ................ | H01P 1/2135 |

* cited by examiner

*Primary Examiner* — Samuel S Outten

(74) *Attorney, Agent, or Firm* — MUGHAL GAUDRY & FRANKLIN PC

(57)　　　　　　　ABSTRACT

An apparatus comprising a resonator structure comprising a first transmission line and first two symmetric ring-shaped stubs with substantially equal width and length, placed substantially in a middle of the first transmission line. The apparatus further comprises a cross-coupling line structure for induction of crosstalk, the cross-coupling line structure comprising a second transmission line and second two symmetric ring-shaped stubs, wherein the second transmission line is coupled to a DC or pulsed voltage source.

14 Claims, 16 Drawing Sheets

100

500

520

600

$C_{eff} = C_{gnd} + C_{adj}$

612

614

620

$C_{eff} = C_{gnd}$

632

640

$C_{eff} = C_{gnd} + 2 \times C_{adj}$

652

654

700

FANO BASED TIME DIVISION DUPLEXING SWITCH

TECHNICAL FIELD

At least one example generally relates to switching of signals, and more particularly to Fano based time division duplexing switch (TDD), employing crosstalk methodology, for 5G/6G communication systems and On-Chip MIMO transceivers.

BACKGROUND

Frequency division duplexing (FDD) and time division duplexing (TDD) are two different spectrum sharing methods in radio communications. In FDD, transmission and reception take place simultaneously at two different frequencies while in TDD, the same frequency is used for both reception and transmission but at different time slots. A good TDD switch has high isolation and low insertion loss. In U.S. Pat. No. 10,186,744, a dual port electromagnetically induced transparency (EIT) based band-pass filter is presented. The structure consists of two open stubs of quarter wavelength each placed at some distance from each other. Each open stub behaves like a resistor-inductor-capacitor (RLC) series circuit. Both stubs interfere destructively to produce the resonance effect at a particular predetermined frequency, leading to the EIT window. The transmission peak of the EIT can be changed to different frequency by changing the capacitance between the two resonant stubs. Here, the approach is to place a lumped capacitor between the two resonant stubs to change the resonance frequency of circuit and use it as a TDD switch. However, using a lumped capacitor in a complementary metal oxide semiconductor (CMOS) stack is inefficient because connecting and disconnecting it requires the use of a transistor and vias, which incurs resistive losses. Thus, using a lumped capacitance between the two stubs is an infeasible solution.

The background description provided here is for the purpose of generally presenting the context of the disclosure. Unless otherwise indicated here, the material described in this section is not prior art to the claims in this application and is not admitted to be prior art by inclusion in this section.

BRIEF DESCRIPTION OF THE DRAWINGS

At least one embodiment may be understood more fully from detailed description given below and from accompanying drawings, which, however, should not be taken to be limiting, but are for explanation and understanding.

DETAILED DESCRIPTION

Figure 1:
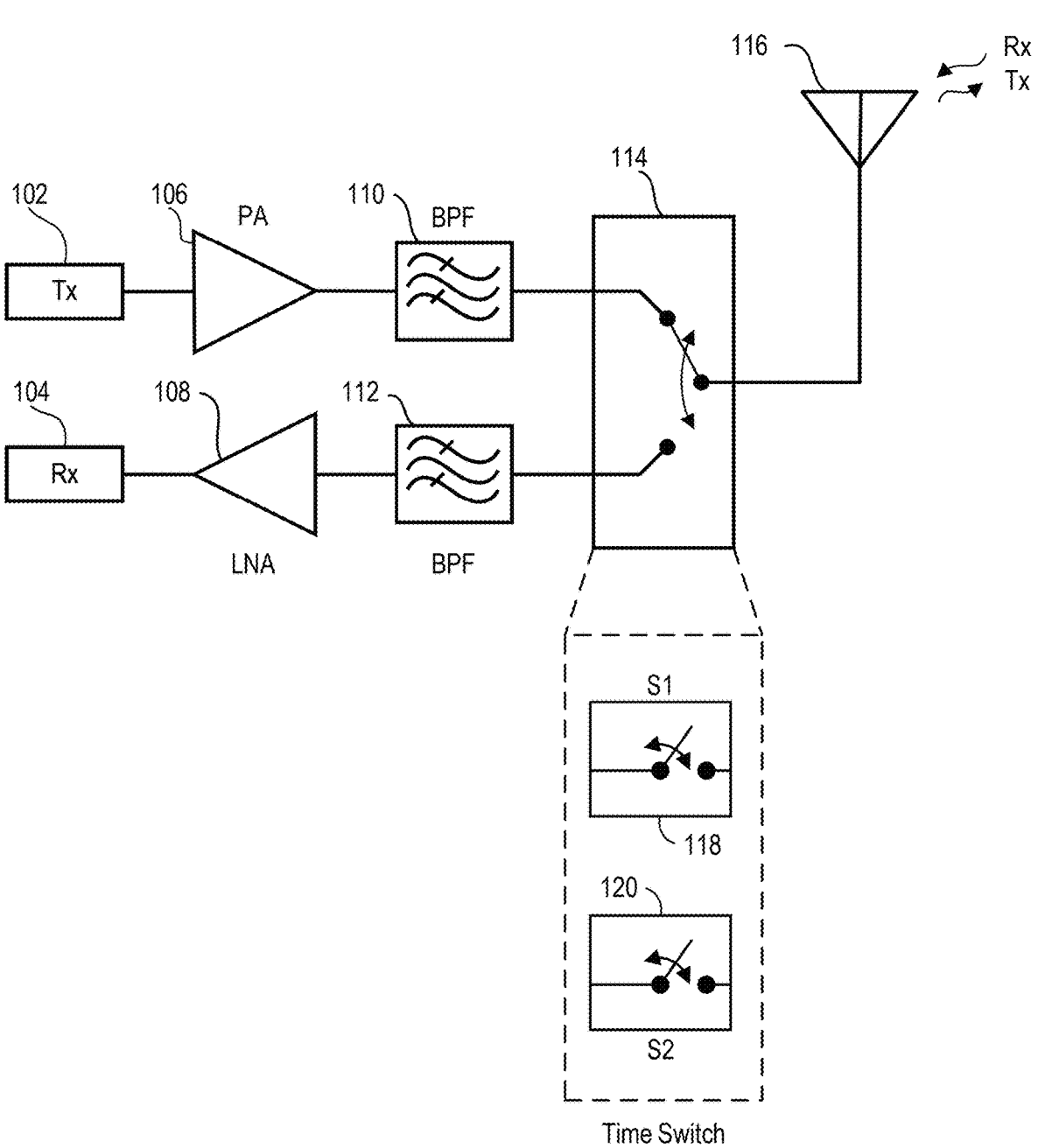
FIG. 1 is a schematic that illustrates a functional diagram of a time division duplexing based transceiver circuit, in accordance with at least one example.

In at least one example, a crosstalk-based method is provided to change the capacitance, and hence, changing the resonance frequency of a TDD Switch. The crosstalk-based method can be used in the CMOS stack by using the top or bottom metal layers. By applying a signal to a top or bottom metal layer, the mutual capacitance can be changed between the top and bottom transmission lines, thus achieving the desired shift in the resonance frequency of a Fano based resonator. This phenomenon in turn is used to make a switch with low insertion loss and better isolation. Two such switches are used to connect the antenna with transmitter and receiver at a desired time, thus accomplishing the time division duplexing.

In at least one example, the Fano resonance-based Time Division Duplexing (TDD) switch incorporates a ring-shaped resonator that utilizes frequency shifting by changing the mutual capacitance due to crosstalk with a top or a bottom transmission line connected to a circuit comprises a DC or pulsed voltage source. In at least one example, the Fano based resonator exhibits frequency shift for on-state and off-state by utilizing crosstalk with top or bottom transmission line excited by DC or pulsed voltage source. In at least one example, the change in the mutual capacitance through crosstalk replaces the lumped capacitor between the resonator stubs. In at least one example, the TDD switch provides low insertion loss, low power dissipation and good isolation between receiver and transmitter. In at least one example, the TDD switch can be implemented on-chip in integrated circuit (IC) fabrication technology and on a multilayer printed circuit board (PCB). In at least one example, the Fano based TDD switch is used in a number of applications including 5G/6G communication systems and on-chip multi-input and multi-output (MIMO) transceivers, radar sensors on autonomous vehicles, etc.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker to indicate more constituent signal paths and/or have arrows at one or more ends to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

It is pointed out that those elements of the figures having the same reference numbers (or names) as the elements of any other figure can operate or function in any manner like that described but are not limited to such.

FIG. 1 is a schematic that illustrates a functional diagram of a time division duplexing based transceiver circuit 100, in accordance with at least one example. In at least one example, transceiver circuit 100 comprises transmitter 102, receiver 104, power amplifier (PA) 106, low noise amplifier (LNA) 108, band pass filters 110 and 112, antenna switch 114, and antenna 116. In at least one example, transmitter 102 and receiver 104 are connected to a common antenna 116 through antenna switch 114. In at least one example, antenna switch 114 comprises two single pole single throw (SPST) switches S1 118 and S2 120 that switch between transmitter 102 and receiver 104. In at least one example, module 114 may be implemented using two complementary switches S1 118 and S2 120.

In at least one example, transmitter 102 transmits when switch S1 118 is closed and switch S2 120 is opened. In at least one example, receiver 104 may receive when switch S1 118 is opened and switch S2 120 is closed.

In at least one example, antenna switch 114 allows bidirectional flow of signal of same frequency for uplink and downlink communication by assigning two different time slots. Depending on the communication need, antenna switch 114 connects transmitter 102 or receiver 104 to antenna 116 that is used to transmit or receive signals.

Figures 2A, 2B:
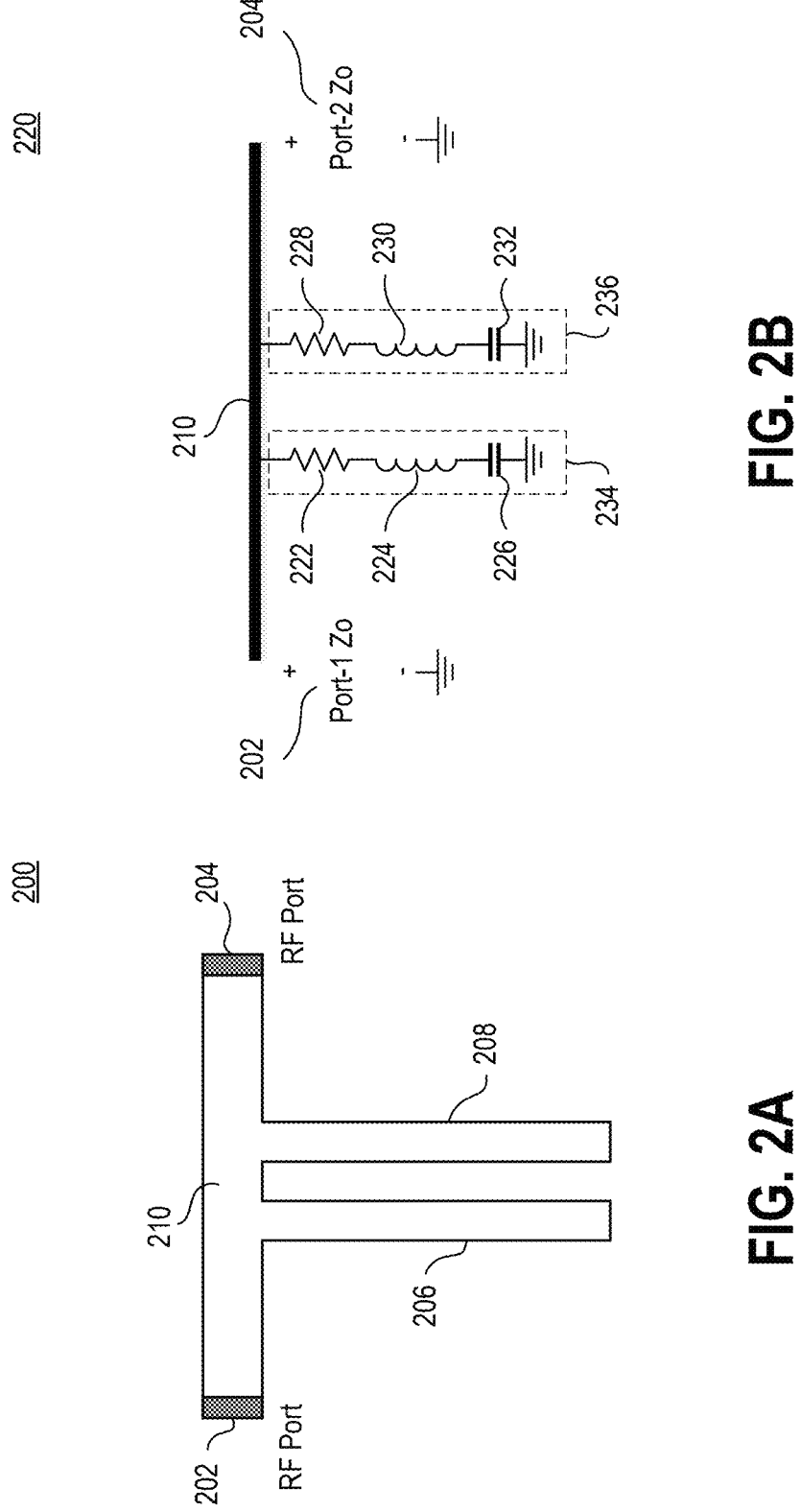
FIGS. 2A-B are schematics that illustrate the structure of highly selective dual stub Fano based resonator circuit, which resonates at a particular frequency band, in accordance with at least some examples.

FIG. 2A is a schematic that illustrates a Fano based resonator 200 with two straight stubs, in accordance with at least one example. In at least one example, resonator 200 comprises two ports, RF port 202 and RF port 204, stubs 206 and 208, and transmission line 210. In at least one example, RF ports 202 and 204 are at the ends of transmission line 210. In at least one example, stub 206 and stub 208, having the same length, may be placed close to each other on transmission line 210. Stubs 206 and 208 resonate at same frequency, but due to destructive interference between the two stubs, a very narrow transmission window may be generated.

FIG. 2B is a schematic of an equivalent resistor-inductor-capacitor (RLC) model 220 of Fano based resonator 200 illustrated in FIG. 2A, in accordance with at least one example. In at least one example, stub 206 may be modeled as an RLC circuit 234 comprising a resistor 222, an inductor 224 and a capacitor 226. In at least one example, stub 208 is modeled as an RLC circuit 236 comprising a resistor 228, an inductor 230 and a capacitor 232. In at least one example, RLC circuits 234 and 236 may resonate at the same frequency but due to a phase difference in their response, the destructive interference between the two may generate a very sharp transparency window between RF port 202 and RF port 204.

Figure 3:
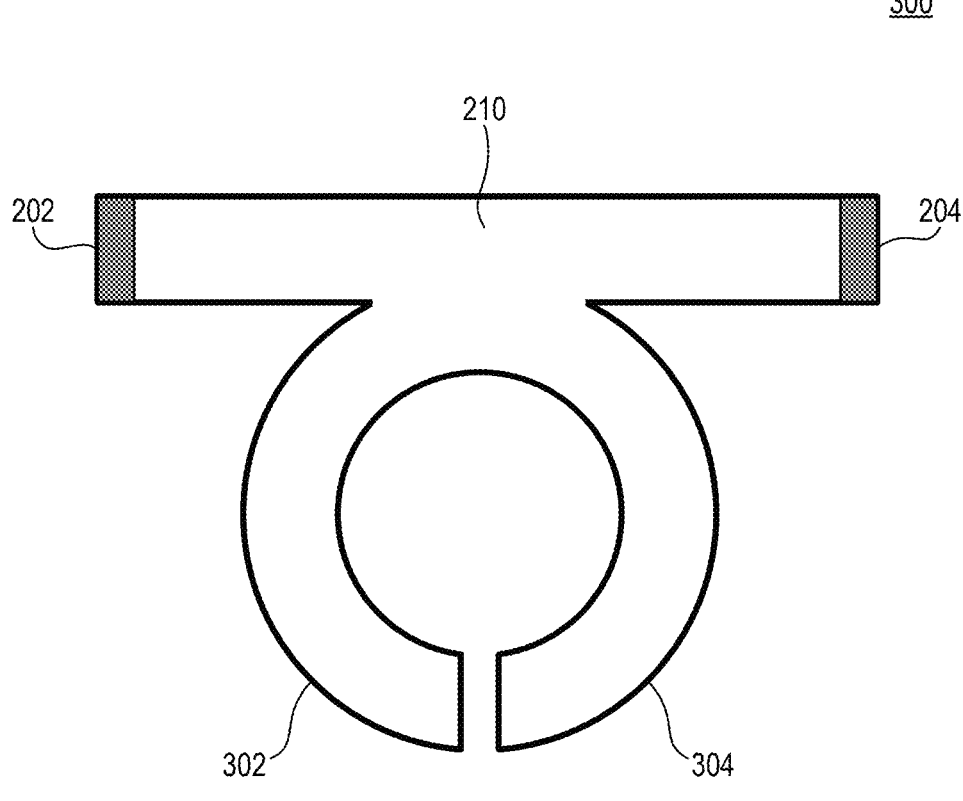
FIG. 3 is a schematic that illustrates the structure of highly selective dual stub Fano ring resonator circuit to reduce the resonator size, which resonates at a particular frequency band, in accordance with at least one example.

FIG. 3 is a schematic of ring structure of a resonator 300 that exhibits Fano resonance phenomenon, in accordance with at least one example. In at least one example, resonator 300 includes two ports, RF port 202 and RF port 204, at the two ends of transmission line 210. In at least one example, stubs 206 and 208 of FIG. 2A may be shaped into a ring structure comprising two round stubs; stub 302 and stub 304. In at least one example, round stubs 302 and 304 also resonate at the same frequency, generating a very narrow transmission window similar to the structure illustrated in FIG. 2A. In at least one example, the ring structured stubs may also reduce the size of resonator 300 and save area for on-chip implementation.

Figure 4:
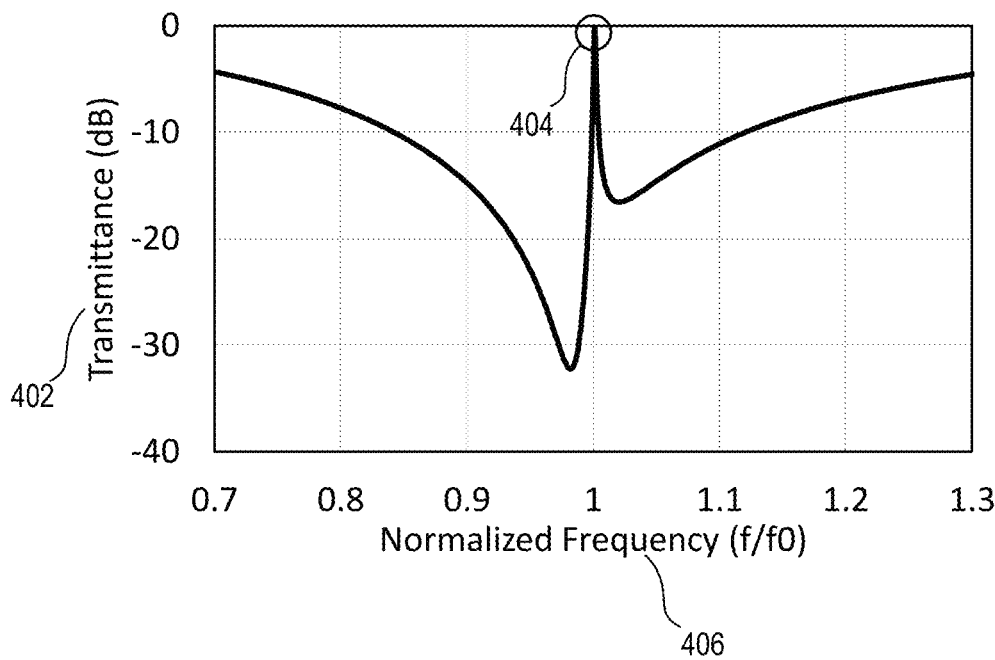
FIG. 4 is a plot that illustrates the Fano resonance response of the dual stub resonator structure of FIGS. 2A and B and FIG. 3, in accordance with at least one example.

FIG. 4 is a plot 400 showing transmittance parameter 402 against normalized frequency 406 of the resonator illustrated in FIG. 3, in accordance with at least one example. In at least one example, transparency window 404 between the two RF ports 202 and 204 of FIG. 3 may be very sharp and hence highly selective. In at least one example, the high selectivity and the asymmetric spectral response of Fano resonance may ensure high isolation between ports.

Figure 5A:
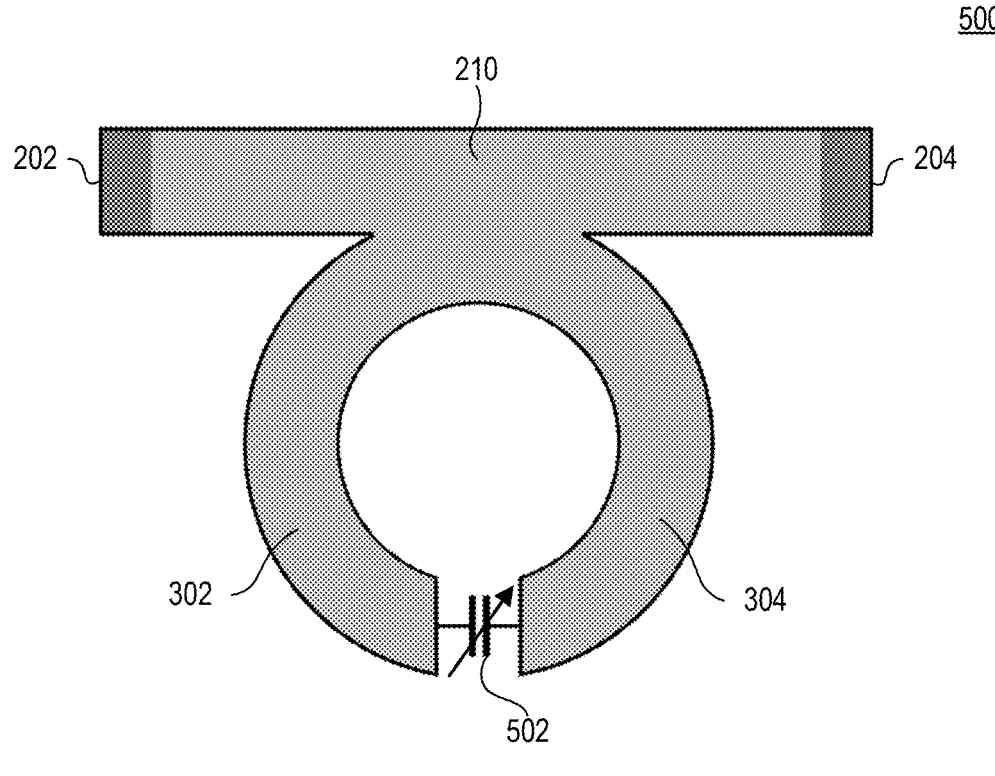
FIG. 5A is a schematic that illustrates a lumped variable capacitor, connected to the end of the round stubs, in accordance with at least one example.

FIG. 5A is a schematic of a resonator 500 with a variable capacitor to shift the frequency of operation of resonator 500, in accordance with at least one example. In at least one example, resonator 500 may be a Fano based resonator circuit comprising transmission line 210 and the two round open stubs, stub 302 and stub 304. In at least one example, the length of the stubs may determine the frequency of operation of the Fano based resonator. In at least one example, the change in capacitance of a variable capacitor 502 at the end of the open stubs; stub 302 and stub 304 may also change phase and ultimately the frequency of operation of resonator 500. In at least one example, a time switch circuit is realized by changing capacitance of capacitor 502 between two levels to get two frequency responses, one for an on-state and the other for an off-state. In at least one example, very high isolation may be achieved between the on-state and off-state frequency responses due to very high-quality factor and asymmetric resonance response of Fano based resonator 500.

In at least one example, variable capacitor-based time switch circuit of resonator 500 is on-chip. In at least one example, on-chip implementation of the variable capacitor-based time switch circuit may use tungsten vias to connect on-chip variable capacitor 502 with Fano resonance-based resonator 500.

Figure 5B:
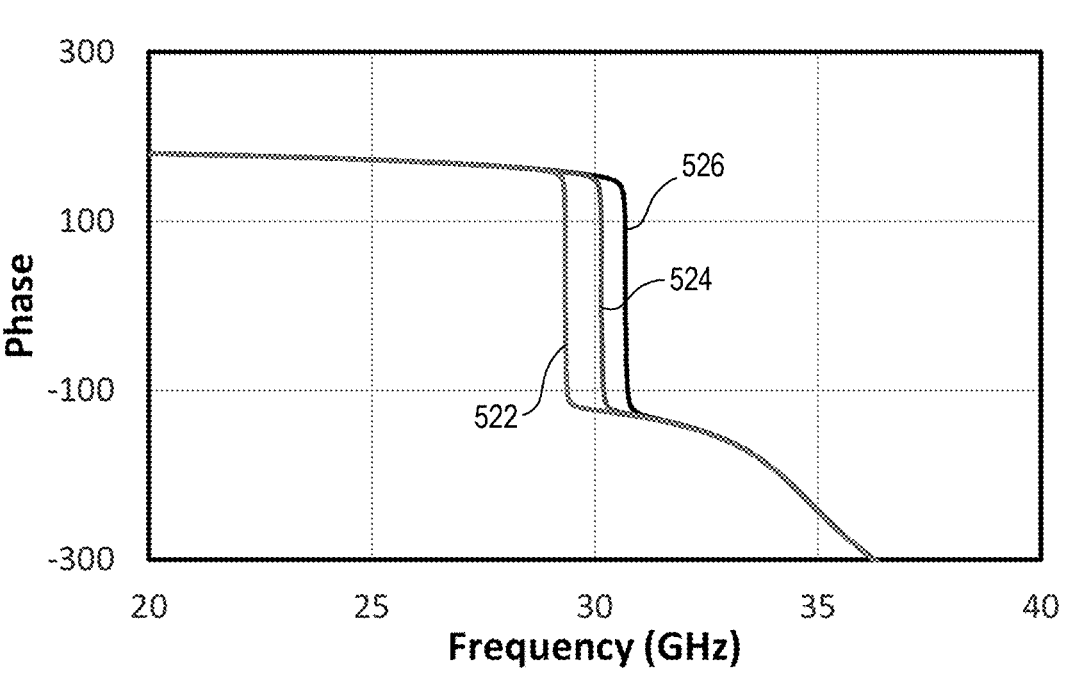
FIG. 5B is a plot that illustrates a phase shift in the phase response of the resonator, in accordance with at least one example.

FIG. 5B illustrates a plot 520 showing the shift in phase response of the resonator by connecting a variable lumped capacitor 502 as illustrated in FIG. 5A, in accordance with at least one example. In at least one example, the response depicts the phase to shift from 522 to 524 and then to 526 by changing the variable capacitance.

Figure 6A:
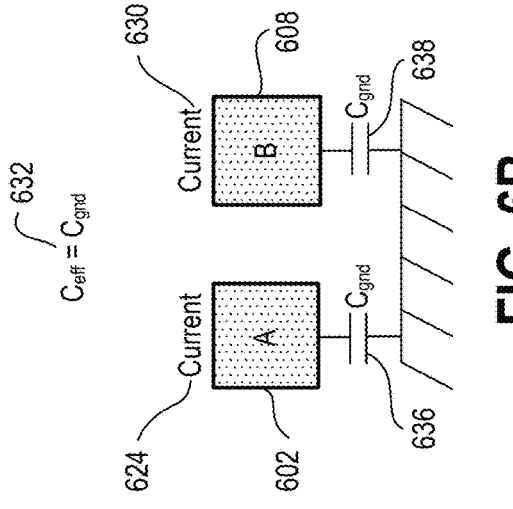
FIG. 6A is a schematic that illustrates the effect of closely placed interconnects, when both interconnects have no switching activity and are at constant level on the coupling capacitance, in accordance with at least one example.

FIG. 6A is a schematic 600 illustrating the coupling capacitance, between two closely placed interconnects, in accordance with at least one example. In at least one example, interconnect 602 conducts a current 604 at a constant or zero level in absence of any switching activity, and the interconnect 608 conducts current 610 at a constant level or zero level in absence of any switching activity, developing a coupling capacitance 614 among them. Interconnect 602 and interconnect 608 may also develop a coupling capacitance 616 and coupling capacitance 618 respectively with the ground. The effective capacitance $C_{eff}$ 612 may be given as follows:

$$C_{eff} = C_{gnd} + C_{adj}$$

Figure 6B:
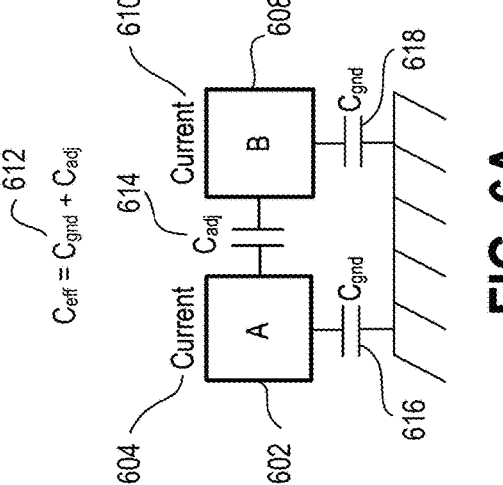
FIG. 6B is a schematic that illustrates the effect of closely placed interconnects, having switching activity such that both conduct current in the same direction on the coupling capacitance.

FIG. 6B is a schematic 620 that illustrates the effect on the coupling capacitance when interconnect 602 and interconnect 608 are placed in proximity and conduct the current in the same direction in presence of similar switching activity on both interconnects. In at least one example, current 624 and current 630 flowing in the same direction may not develop a mutual capacitance among interconnect 602 and interconnect 608. In at least one example, interconnect 602 and interconnect 608 may develop a coupling capacitance 636 and coupling capacitance 638 respectively with the ground. The effective capacitance 632 may be given as follows:

$$C_{eff} = C_{gnd}$$

Figure 6C:
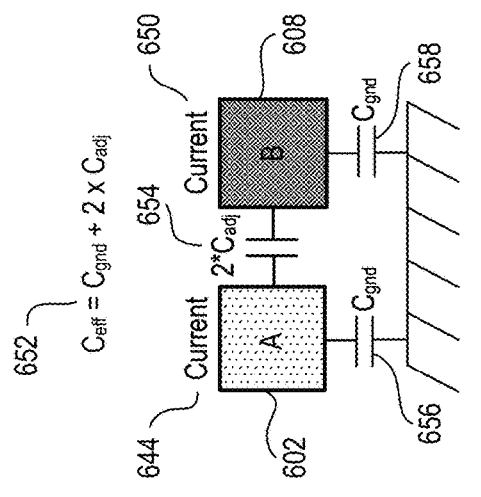
FIG. 6C is a schematic that illustrates the effect of closely placed interconnects having switching activity such that current flows opposite to each other on the coupling capacitance, in accordance with at least one example.

FIG. 6C is a schematic 640 that illustrates the effect on the coupling capacitance when the current flow in interconnect 602 and interconnect 608, placed in close proximity, is opposite to each other in presence of opposite switching activity on both interconnects. In at least one example, the current 644 and current 650 flowing in the opposite direction may develop a mutual capacitance 654 among interconnect 602 and interconnect 608, wherein the mutual capacitance 654 may be twice the mutual capacitance 614 illustrated in FIG. 6A. In at least one example, interconnect 602 and interconnect 608 may develop a coupling capacitance 656 and coupling capacitance 658 respectively with the ground. The effective capacitance 652 may be given as follows:

$$C_{eff} = C_{gnd} + 2 \times C_{adj}$$

Figure 7:
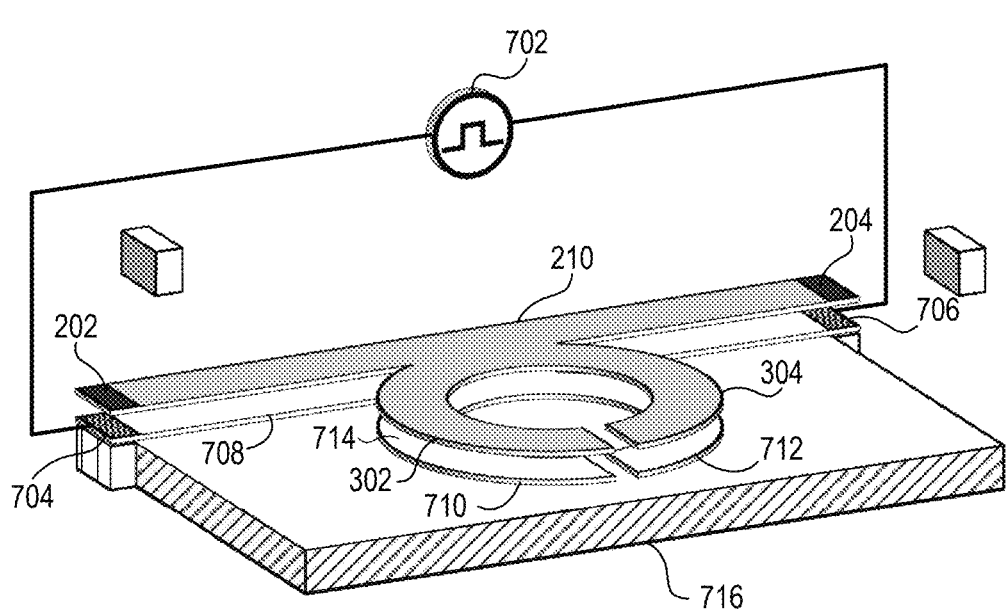
FIG. 7 is a schematic that illustrates the proposed TDD switch circuit based on the crosstalk between the dual stub Fano based resonator and the current carrying conductor, called the cross-coupling line structure, placed in proximity to the dual stub resonator, in accordance with at least one example.

FIG. 7 is a schematic 700 that illustrates the method wherein crosstalk phenomenon is used on Fano based resonator to constitute a Fano based time-division duplexing (TDD) switch, in accordance with at least one example. In at least one example, the disclosed TDD switch may comprise a Fano based resonator, cross-coupling line structure along with its circuitry, DC or pulsed voltage source 702, dielectric material 714 and substrate 716. In at least one example, Fano based resonator may comprise RF port 202, RF port 204, transmission line 210, and stubs 302 and 304. In at least one example, cross-coupling line structure, placed in close proximity to Fano based resonator, may comprise DC or pulsed port 704, DC or pulsed port 706, transmission line 708, and stubs 710 and 712. In at least one example, the voltage source 702 may be connected to the DC or pulsed ports 704 and 706 to supply DC or pulsed current through the cross-coupling line structure in either direction. In at least one example, the proposed TDD switch can be placed on integrated circuit (IC) metal layer stack, where different metal layers are separated by a dielectric material 714. This whole structure can be placed on integrated circuit (IC) substrate 716. For low frequency operation, when the TDD switch becomes large in size, it is feasible to build it on a printed circuit board (PCB) substrate. In at least one example, dielectric material 714 is present between transmission line 210 and transmission line 708, stub 302 and stub 710, and stub 304 and stub 712. The same dielectric material 714 is present on top and bottom of both structures; the fano based resonator structure and the cross-coupling line structure in the IC or the PCB metal layer stack.

In at least one example, the change in voltage level of the cross-coupling line structure, comprising transmission line 708 and stubs 710 and 712, may change the effective capacitance of the Fano based resonator 300 of FIG. 3. In at least one example, the change in voltage level of the cross-coupling line structure may increase the peak transmittance of the Fano based resonator.

In at least one example, the pulse source 702 may be used along with other circuitry that may change the voltage level of the cross-coupling line structure periodically to enable the transmitter and receiver alternatively. In at least one example, due to high selectivity of the Fano resonance, low insertion loss and high isolation between transmitter and receiver may be achieved.

Figure 8:
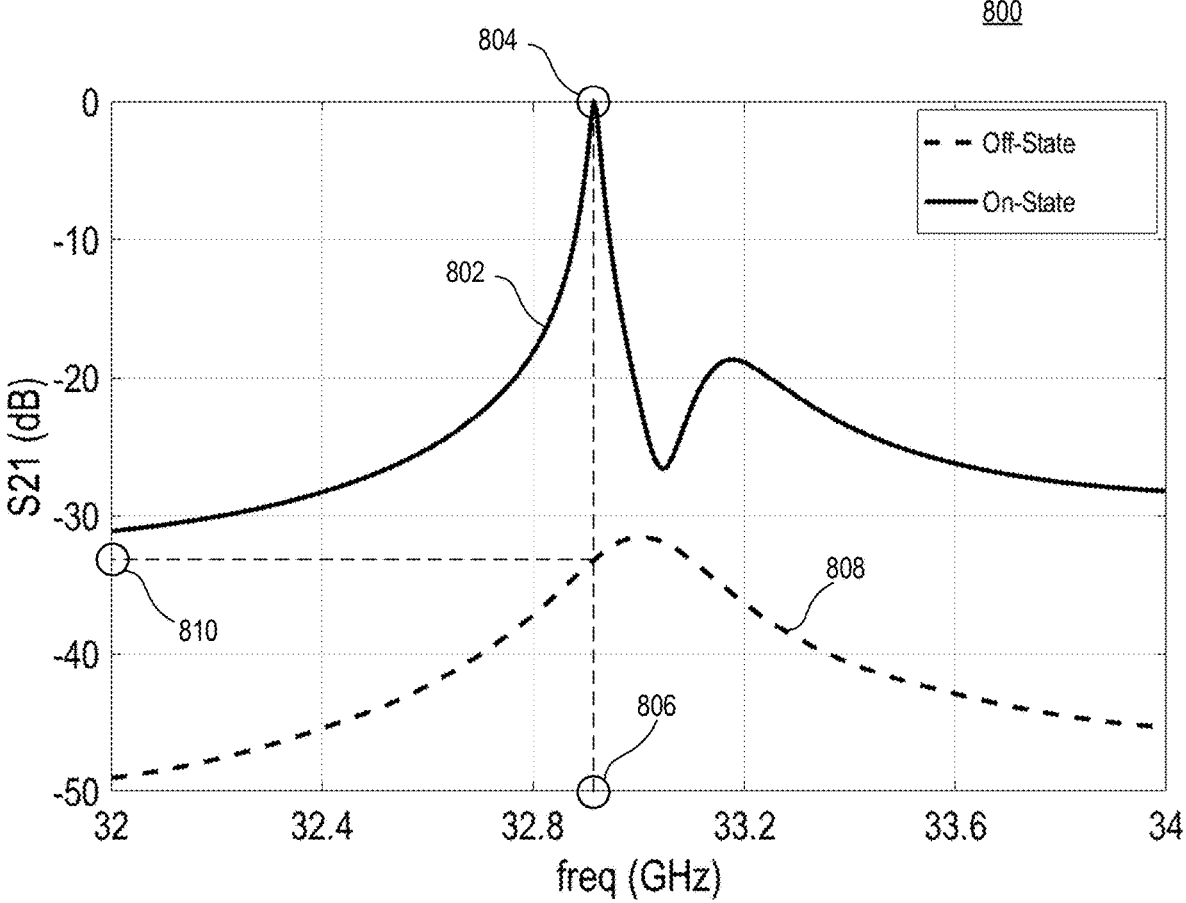
FIG. 8 is a plot that illustrates the on/off state frequency response of the TDD switch of FIG. 7, in accordance with at least one example.

FIG. 8 illustrates a plot 800 showing the frequency response of the proposed Fano based TDD switch, in accordance with at least one example. In at least one example, on-state response 802 generates a highly selective transmittance window 804 at desired operational frequency 806. In at least one example, the on-state response 802 may demonstrate an isolation 810 of more than 30 dB with off-state response 808. This can be enhanced, depending upon the conductivity of the metal layer and the loss tangent (δ) of the dielectric material used to separate the metal layers in multilayer PCB or IC metal layer stack.

Figures 9A, 9B:
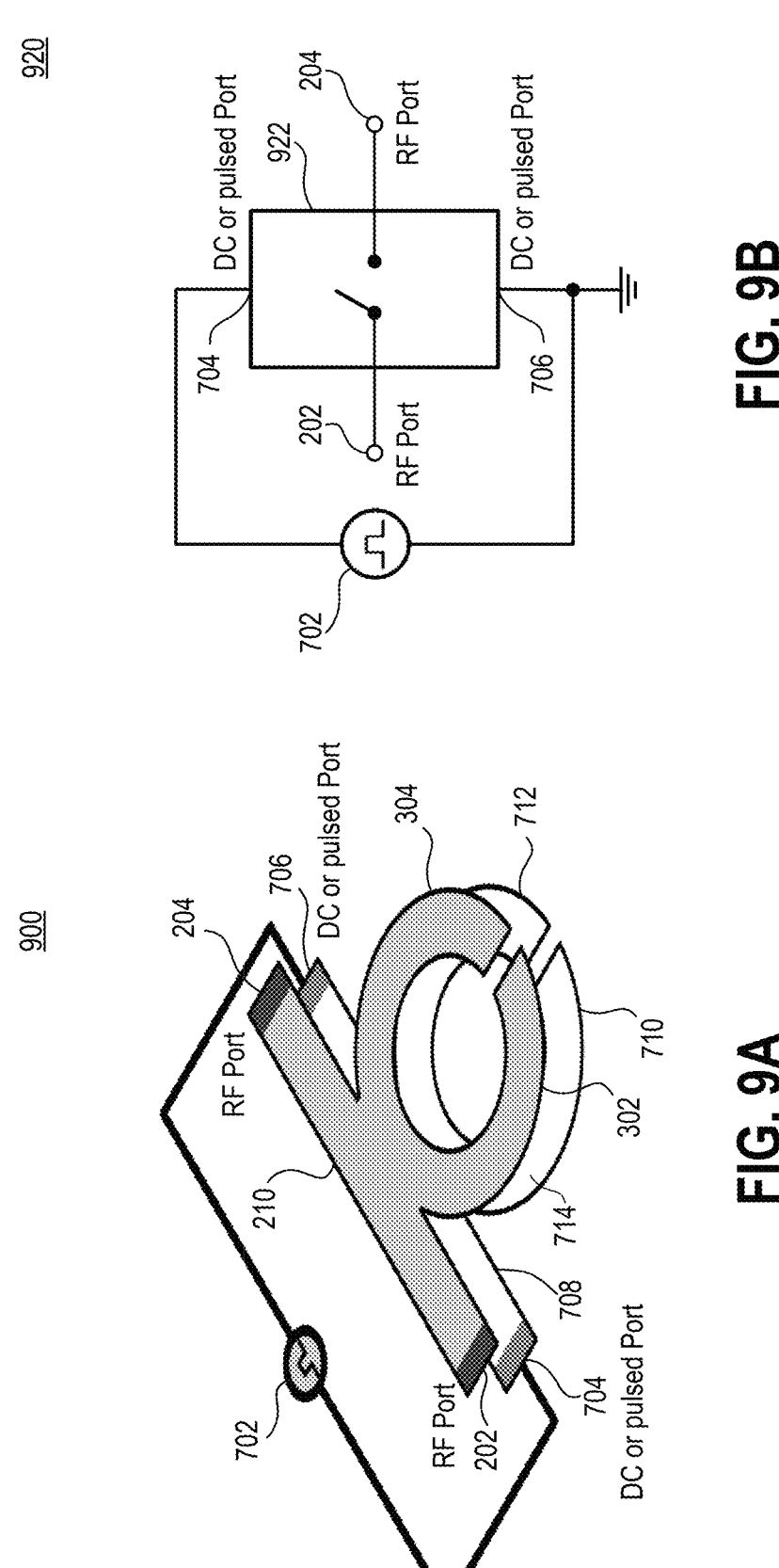
FIG. 9A is a schematic that illustrates the ports of the TDD switch circuit of FIG. 7, in accordance with at least one example.
FIG. 9B is a schematic that illustrates the symbol used for TDD switch circuit of FIG. 7, in accordance with at least one example.

FIG. 9A is a schematic 900 that illustrates the denomination for the ports of the proposed Fano based TDD switch illustrated in FIG. 7, in accordance with at least one example. In at least one example, Fano based resonator comprising two ports, RF Port 202 and RF Port 204, are on either end of transmission line 210, and two round stubs, stub 302 and stub 304, that may be placed close together. A cross-coupling line structure, comprising two ports, DC or pulsed Port 704 and DC or pulsed Port 706, are on either end of transmission line 708, and two round stubs, stub 710 and stub 712, that may be placed close together. The Fano based resonator and cross-coupling line structure are placed in closed proximity to each other separated by a dielectric material 714. In at least one example, the DC or pulsed voltage source 702 may be connected to DC or pulsed ports 704 and 706 of cross-coupling line structure.

FIG. 9B illustrates the symbolic representation 920 of the TDD switch circuit 900 in FIG. 9A, in accordance with at least one example. In at least one example, the TDD switch 922 comprises a Fano based TDD switch. In at least one example, the TDD switch 922 may have two RF ports, RF port 202 and RF port 204, that transmit RF power; and two DC or pulsed ports, port 704 and port 706 to connect the external circuitry; and a DC or pulsed voltage source 702.

Figure 10A:
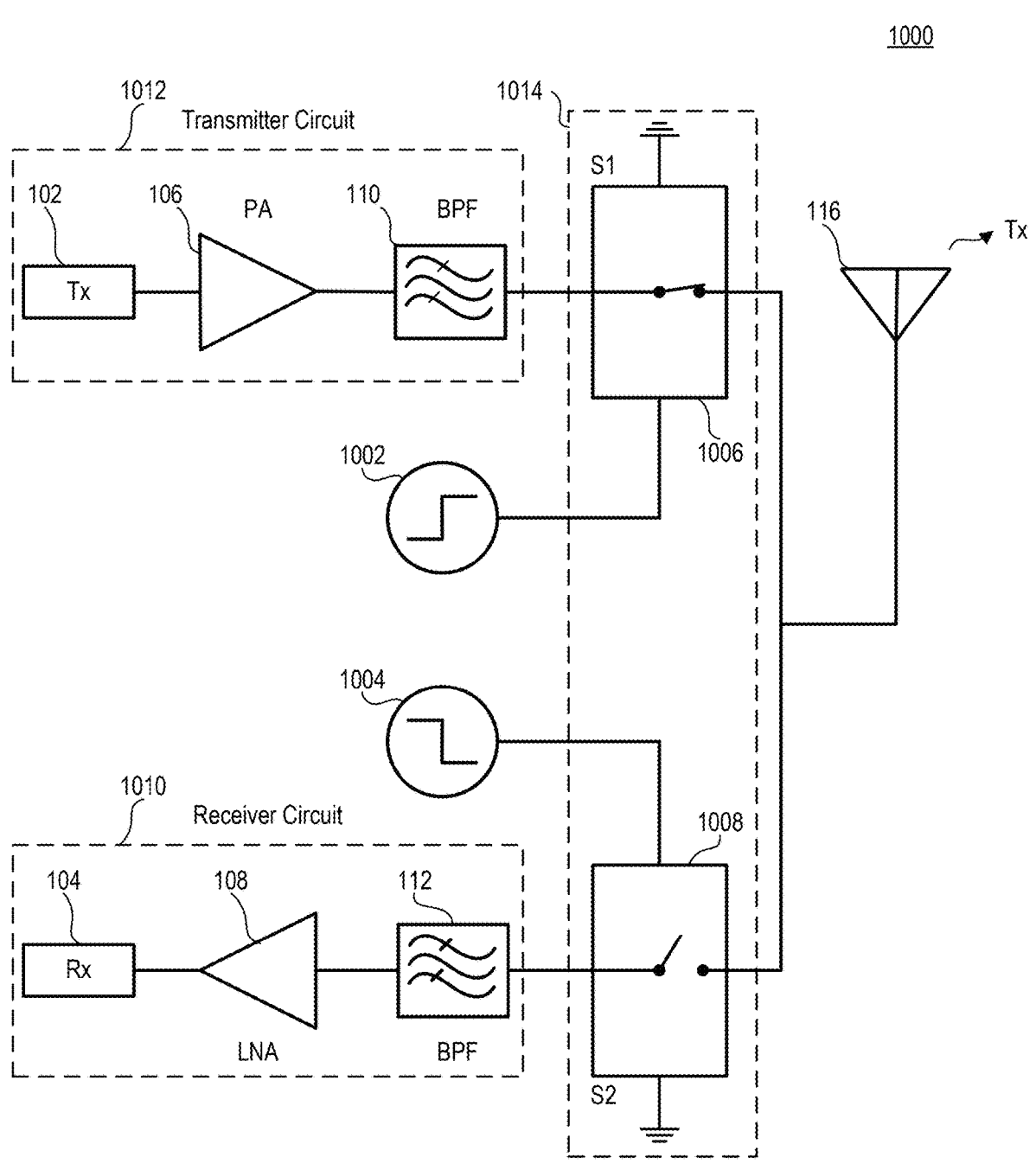
FIG. 10A is a schematic that illustrates the block diagram of a transceiver circuit that operates using the TDD switch of FIG. 7 when transmitter is enabled, in accordance with at least one example.

FIG. 10A is a schematic that illustrates the block diagram of a transceiver circuit 1000 that has a TDD switch circuit of FIG. 9B to transmit or receive the signal, in accordance with at least one example. In at least one example, the transceiver may comprise transmitter circuit 1012, having transmitter 102, power amplifier 106, and band pass filter 110 and receiver circuit 1010, having receiver 104, low noise amplifier 108, and band pass filter 112. In at least one example, the transmitter circuit 1012 may be connected to the TDD switch S1 1006 of FIG. 9B. In at least one example, the DC or pulsed voltage source 1002 may be used to switch the TDD switch S1 1006. Similarly, the receiver circuit 1010 may be connected to the TDD switch S2 1008 which may be switched between two states using the DC or pulsed voltage source 1004 connected to it. In at least one example, antenna switch 1014 may comprise of two TDD switches, S1 1006 and S2 1008 illustrated in FIG. 9B. In at least one example, the two TDD switches, S1 1006 and S2 1008 may have one common terminal that may be connected to antenna 116. In at least one example, the two TDD switches, S1 1006 and S2 1008 may be controlled using two DC or pulsed voltage sources 1002 and 1004 respectively.

In at least one example, antenna switch 1014 may allow bidirectional flow of the signal of same frequency for uplink and downlink communication by assigning two different time slots. Depending on the used duplexing technique, the antenna switch 1014 connects the transmitter circuit 1012 or receiver circuit 1010 to the antenna 116 to transmit or receive the signals.

In at least one example, transmitter circuit 1012 is connected to the antenna 116, when high voltage from DC or pulsed voltage source 1002 is applied at the TDD switch S1 1006, and at the same instance the TDD switch S2 1008 is switched off by applying a low potential using DC or pulsed voltage source 1004.

Figure 10B:
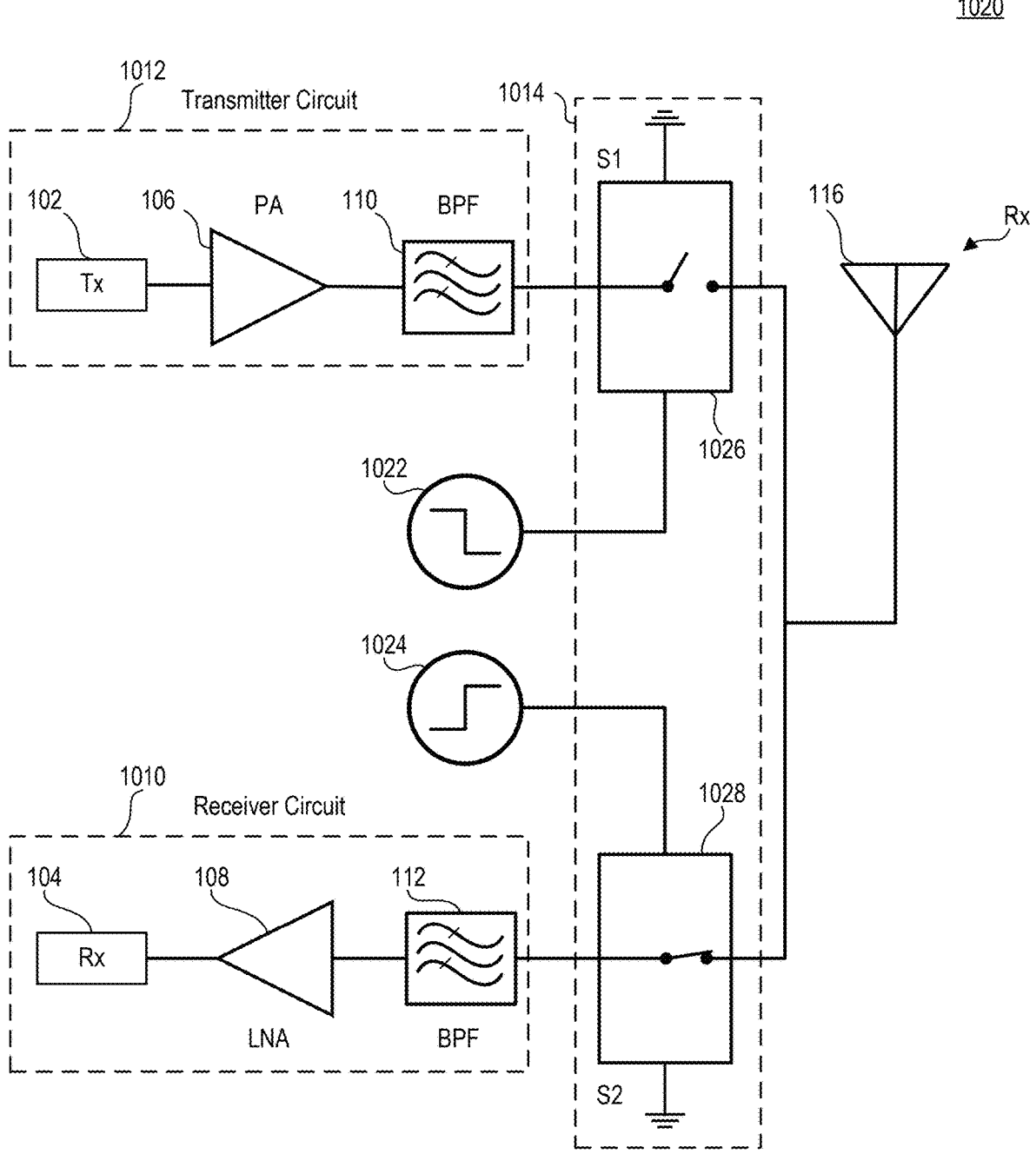
FIG. 10B is a schematic that illustrates the block diagram of a transceiver circuit based on TDD switch of FIG. 7 when receiver is enabled, in accordance with at least one example.

FIG. 10B is a schematic that illustrates the block diagram of a transceiver circuit 1020 that uses the TDD switch circuit of FIG. 9B to receive the electromagnetic signal from the environment using antenna 116. In at least one example, the receiver circuit 1010 may be connected to antenna 116 by using TDD switch S2 1028 in off state by applying a low potential using DC or pulsed source voltage 1024 and TDD switch S1 1026 is switched on by applying a high potential using DC or pulsed voltage source 1022.

Figure 11:
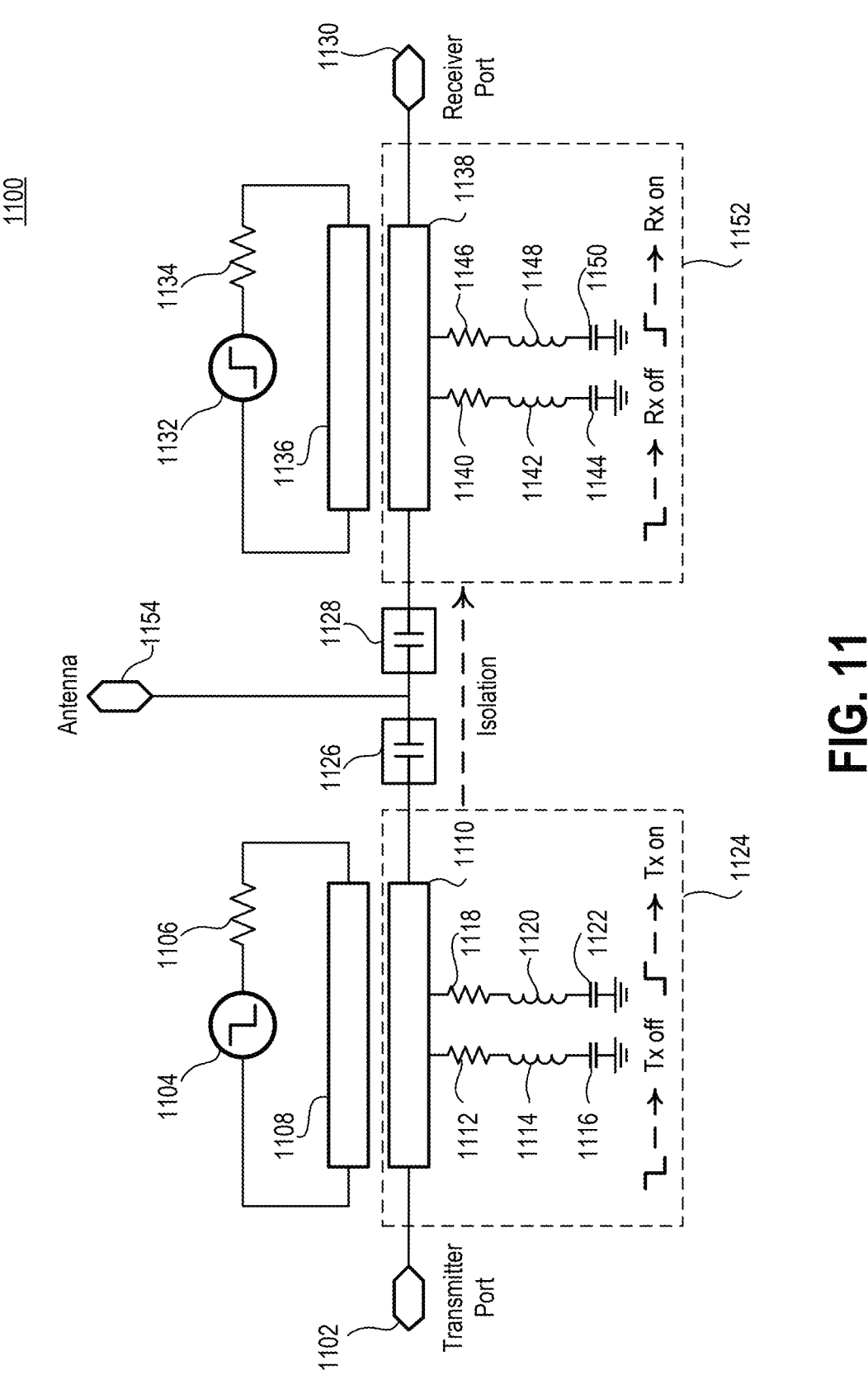
FIG. 11 is a schematic that illustrates the equivalent model of the two TDD switch circuits of FIG. 7 that connect the transmitter and receiver to a common antenna, in accordance with at least one example.

FIG. 11 is a schematic that illustrates the resistor-inductor-capacitor (RLC) model 1100 of TDD switch of FIG. 10, in accordance with at least one example. In at least one example, the transmitter port 1102 connects the transmitter circuit to the one end of the Fano resonance based resonator 1124. In at least one example, cross-coupling line 1108 may be used with the DC or pulsed voltage source 1104 having internal impedance 1106, to implement the phenomenon of crosstalk. In at least one example, the Fano resonance based resonator 1124 comprises a transmission line 1110 and two closely placed stubs that may be modeled as two series RLC circuits comprising resistor 1112, inductor 1114, capacitor 1116, resistor 1118, inductor 1120, and capacitor 1122. Similarly, the receiver circuit may be connected to the other end of the Fano based resonator 1152 through receiver port 1130. In at least one example, the Fano resonance based resonator 1152 comprises a transmission line 1138 and two closely placed stubs that may be modeled as two series RLC circuits comprising resistor 1140, inductor 1142, capacitor 1144, resistor 1146, inductor 1148, and capacitor 1150. The cross-coupling line 1136 is capacitive coupled to the resonator 1152. In at least one example, changing the potential of the cross-coupling line 1136 changes the effective capacitance between the cross-coupling line 1136 and Fano resonance based resonator 1152. The impedance 1134 is the internal impedance of the DC or pulsed source 1132. The isolation between Fano based resonators 1124 and 1152 of transmitter and receiver respectively is modelled by capacitors 1126 and 1128, and are connected to antenna 1154.

Figure 12:
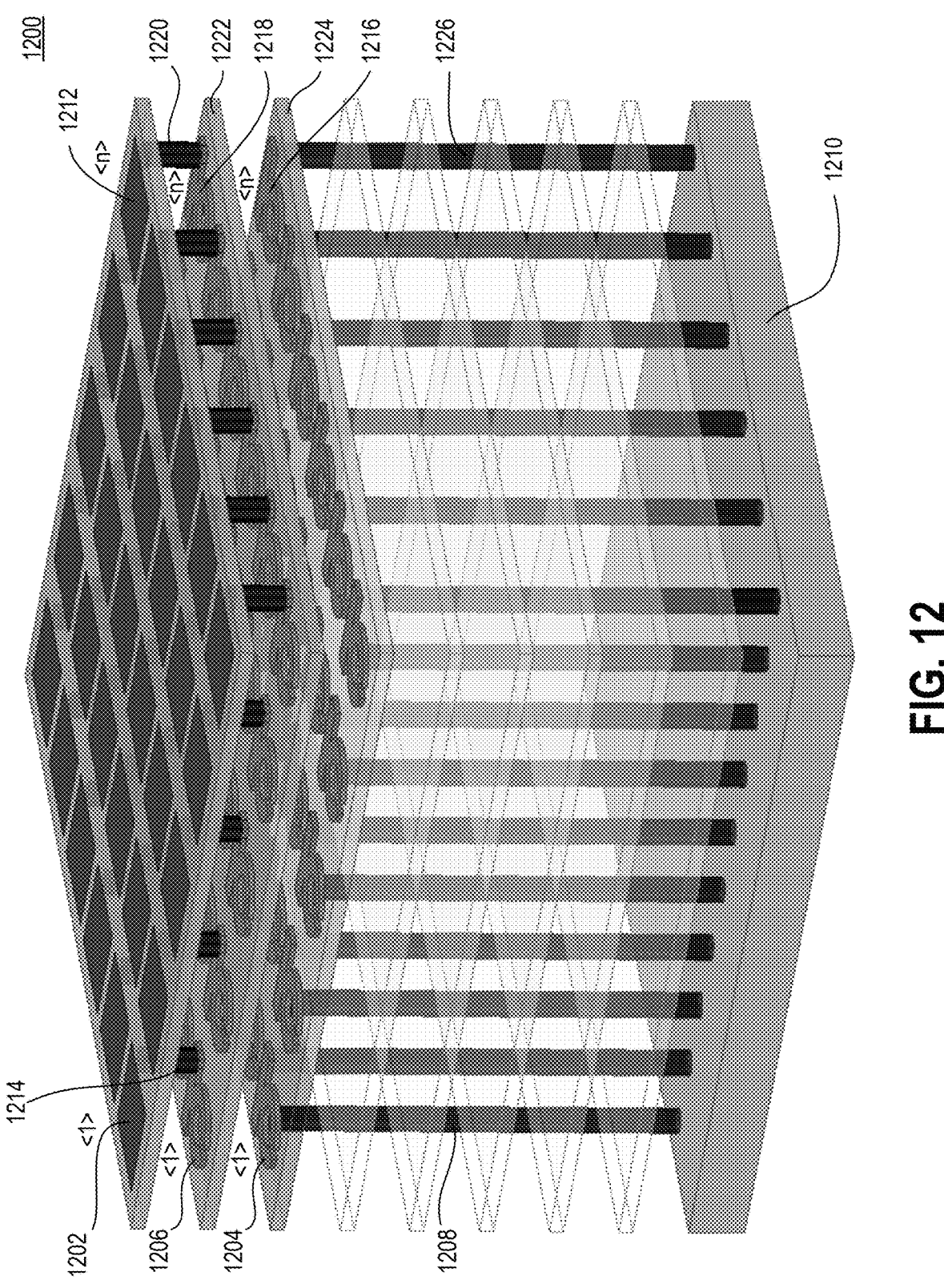
FIG. 12 is a layout that illustrates the on-chip implementation of the TDD switch circuit of FIG. 7, in accordance with at least one example.

FIG. 12 is a schematic that illustrates the on-chip layout 1200 of the proposed TDD switch chip for transceiver, phased array, and MIMO applications, in accordance with at least one example. In at least one example, the TDD switch chip comprises n×n array of on-chip patch antennas, n×n array of Fano based resonators that may be in metal layer 1222, n×n array of cross-coupling line structures that may be in metal layer 1224. In at least one example, the n×n array of Fano based resonators may be in metal layer 1222, right above the metal layer 1224 to ensure capacitive coupling between cross-coupling line structure<1> 1204 and Fano based resonator<1> 1206 up to cross-coupling structure line<n> 1216 and Fano based resonator<n> 1218.

In at least one example, the individual resonator say Fano based resonator<1> 1206 may be connected to the on-chip patch antenna<1> 1202 using via 1214, and the cross-coupling line structure<1> 1204 may be connected to the on-chip circuitry, that may be grown on epitaxy layer right above substrate 1210, using via 1208. Similarly, the Fano based resonator<n> 1218 may be connected to the on-chip patch antenna<n> 1212 using via 1220, and the cross-coupling line structure<n> 1216 may be connected to the on-chip circuitry, that may be grown on epitaxy layer right above substrate 1210, using via 1226.

Figure 13:
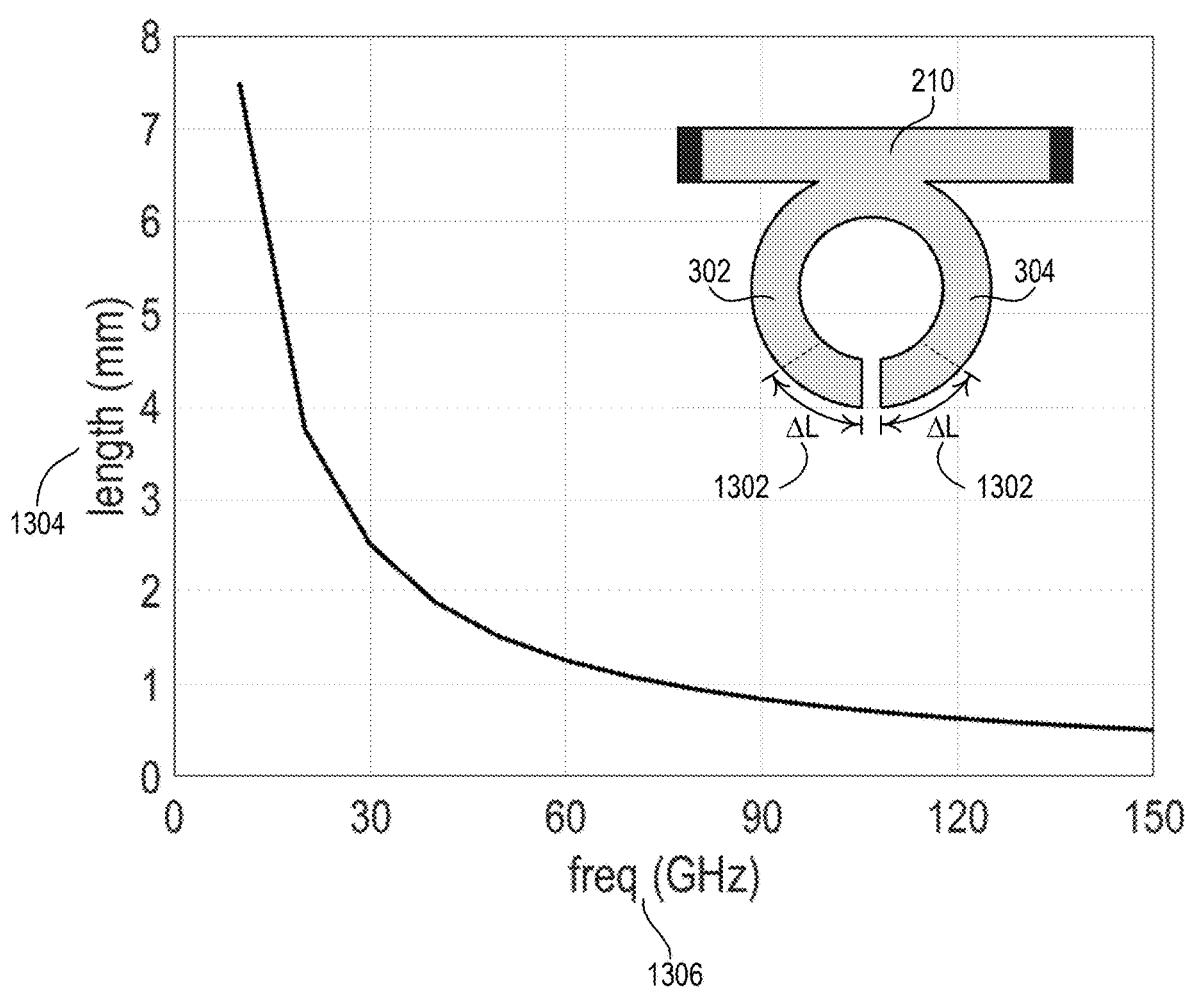
FIG. 13 is a plot that illustrates the change of resonant frequency in relation to the change of length of stubs of a Fano based resonator, in accordance with at least one example.

FIG. 13 is a plot 1300 that illustrates the scalability of the proposed TDD switch by changing the length of stubs of the Fano based resonator, in accordance with at least one example. In at least one example, change in length 1302 of the stub 302 and stub 304, placed on the transmission line 210, may change the resonant frequency 1306 of the Fano based resonator illustrated in FIG. 7. In at least one example, the relation between the length (mm) 1304 of the stubs 302 and 304 of the Fano based resonator and the resonant frequency (GHz) 1306 can be given as follows:

$$\lambda = 4 \times L$$

$$f = \frac{c}{\lambda}$$

In at least one example, variation in the lengths 1302 of the stub 302 and stub 304 may allow one skilled in the art to operate the Fano based resonator, illustrated in FIG. 7, at desired frequency for switching the TDD switches 1006 and 1008 and TDD switches 1026 and 1028, illustrated in FIG. 10A and FIG. 10B, respectively. This ensures TDD switch comprising Fano based resonator may be scalable to the desired frequency of operation by appropriately reducing the dimensions of the resonator. Thus, making the invention suitable for all frequencies from sub 6 GHZ band to mm-wave, and THz bands.

In at least one example, changing the radius/circumference of the ring-shaped stubs 302 and 304 of the Fano based resonator, illustrated in FIG. 7, may also change the resonant frequency 1306 in a similar manner. The higher bands are particularly important for automotive radars and the upcoming 6G applications, which may require frequencies greater than 100 GHz. Ones skilled in the art can readily understand that 150 GHz is not an upper limit; rather, by appropriately lowering the dimensions, the Fano based resonators may also resonate at higher frequencies.

Figure 14:
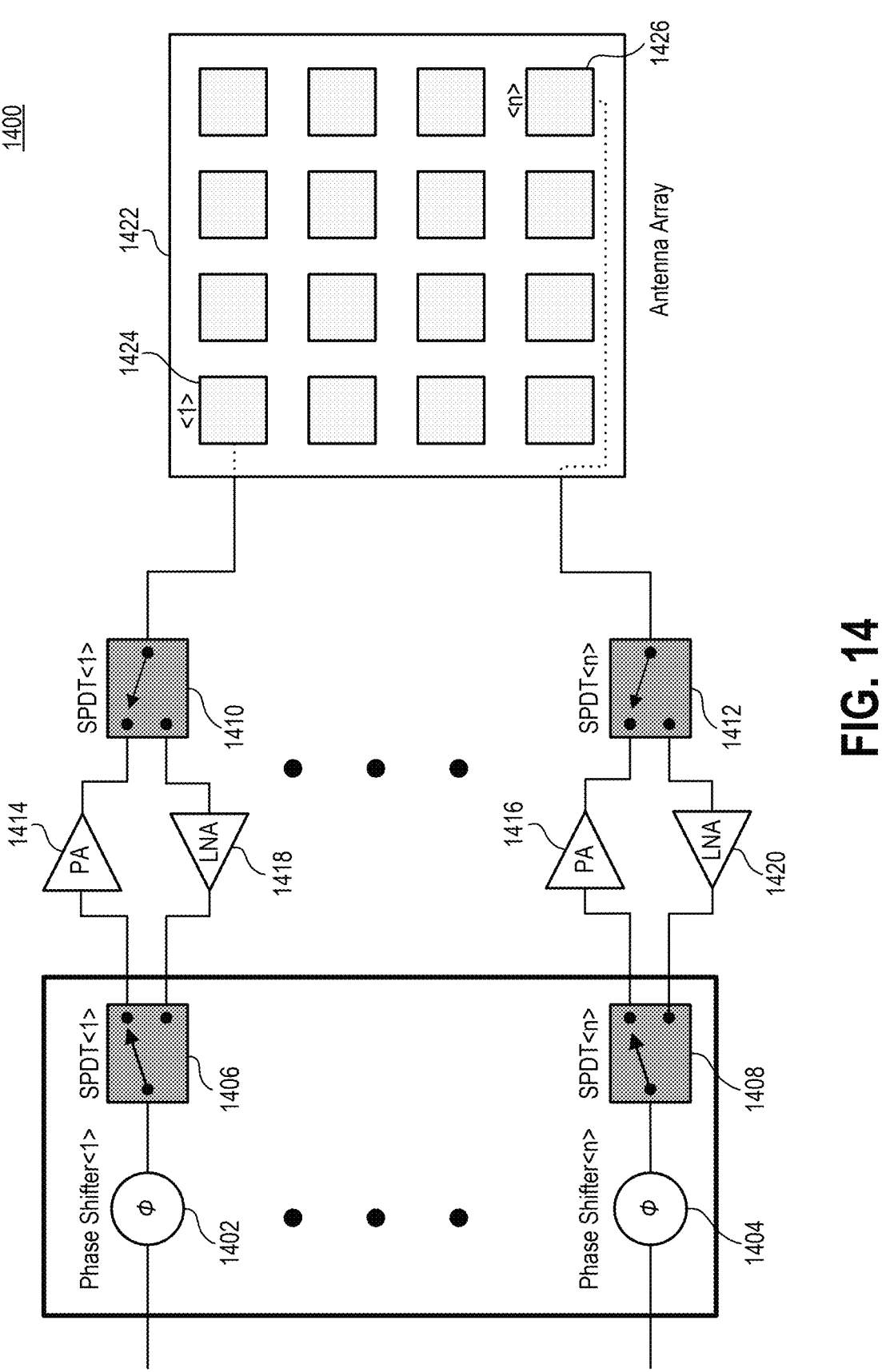
FIG. 14 is a schematic that illustrates the use of TDD switch of FIG. 7 in MIMO and phased array based system suitable for 5G/6G systems, in accordance with at least one example.

FIG. 14 is a schematic 1400 that illustrates the application of proposed TDD switch in phased array systems, in accordance with at least one example. In at least one example, the phased array or MIMO system may comprise phase shifters; Phase Shifter<1> 1402 and Phase Shifter<n> 1404, TDD switches; SPDT<1> 1406, SPDT<n> 1408, SPDT<1> 1410, and SPDT<n> 1412, power amplifier (PA) 1414, power amplifier (PA) 1416, low noise amplifier (LNA) 1418, low noise amplifier (LNA) 1420, and n×n antenna array 1422. In at least one example, individual antenna say antenna<1> 1424, in the n×n antenna array 1422, may require a phase shifter<1> 1402 and TDD switch SPDT<1> 1406, SPDT<1> 1410 to either transmit using power amplifier (PA) 1414 or receive using low noise amplifier (LNA) 1418. Similarly, antenna<n> 1426 may require phase shifter<n> 1404 and TDD switch SPDT<n> 1408, SPDT<n> 1412, along with power amplifier (PA) 1416 and low noise amplifier (LNA) 1420 to either transmit or receive.

Figure 15:
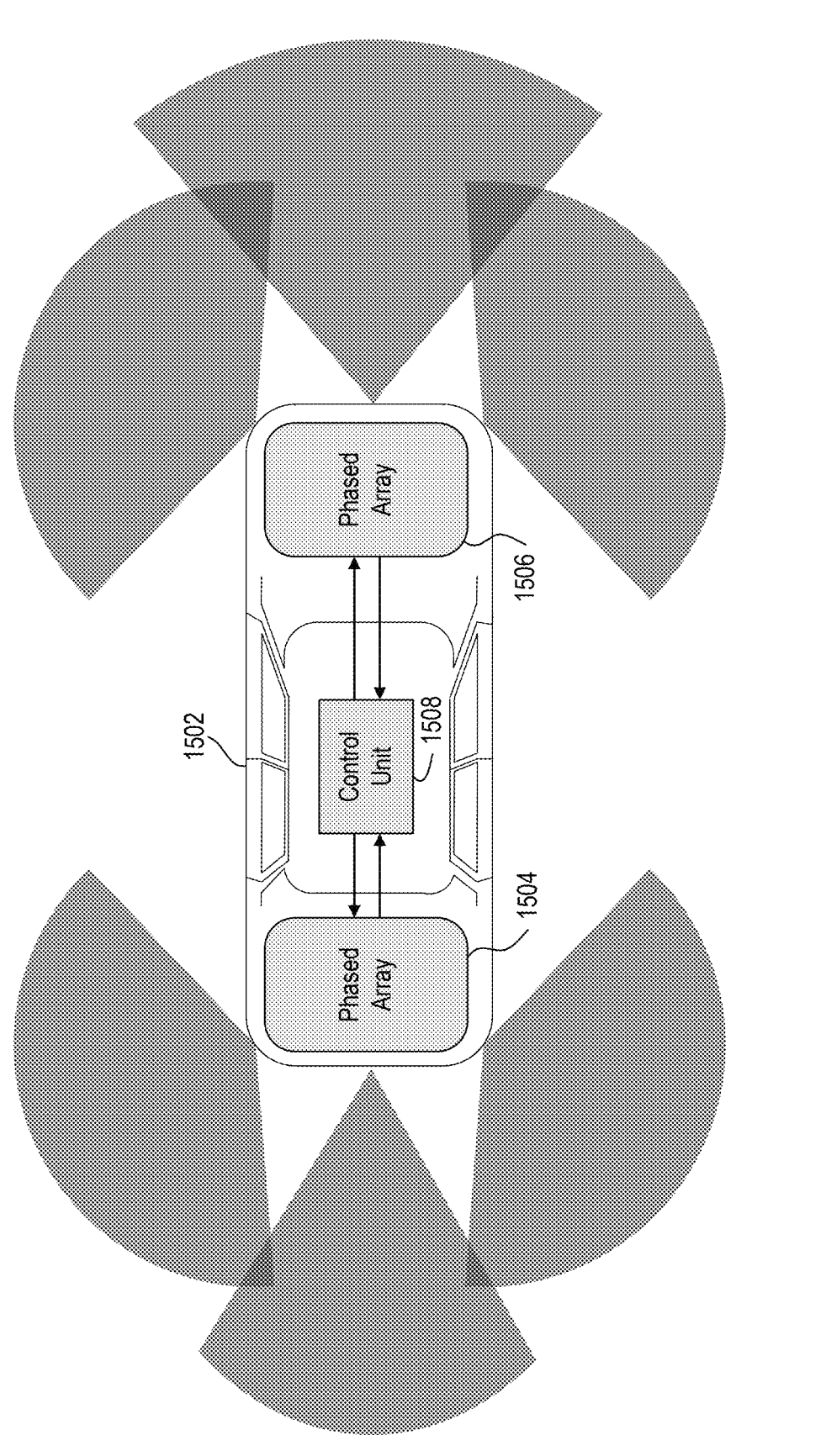
FIG. 15 is a schematic that illustrates the application of phased array based MIMO modules integrated in automotive radar systems, in accordance with at least one example.

FIG. 15 is a schematic that illustrates the application 1500 of the phased array or MIMO system, illustrated in FIG. 14, in the vehicular automotive sensing systems, in accordance with at least one example. In at least one example, a vehicle 1502 may be equipped with multiple sensors. In at least one example, the transmission and reception frequency of the automotive radar sensors may be in the 50 GHz or higher band. The invention has potential to be used in phased array or MIMO systems 1504 and 1506 with the proposed TDD switch illustrated in FIG. 7. The phased array systems 1504 and 1506 may comprise of multiple TDD switches communicating with different systems. In at least one example, the phased array systems 1504 and 1506 may also communicate with an essential Control Unit 1508, designed by the ones skilled in the art, within the vehicle for effective response and decision making by the driver or the vehicle itself.

The application 1500 of Phased Array systems 1504 and 1506, comprising the proposed TDD switches, in autonomous vehicles may offer various benefits including, but not limited to, improved resolution and accuracy, obstacle detection, enhanced range, and other merits known to the ones skilled in the art.

Throughout specification and in claims, "connected" may generally refer to a direct connection, such as electrical, mechanical, or magnetic connection between things that are connected, without any intermediary devices.

Here, "coupled" may generally refer to a direct or indirect connection, such as a direct electrical, mechanical, or magnetic connection between things that are connected or an indirect connection, through one or more passive or active intermediary devices.

Here, "adjacent" may generally refer to a position of a thing being next to (e.g., immediately next to or close to with one or more things between them) or adjoining another thing (e.g., abutting it).

Here, "circuit" or "module" may generally refer to one or more passive and/or active components that are arranged to cooperate with one another to provide a desired function.

Here, "signal" may generally refer to at least one current signal, voltage signal, magnetic signal, or data/clock signal. Here, meaning of "a," "an," and "the" include plural references. Here, the meaning of "in" includes "in" and "on".

Here, "scaling" may generally refer to converting a design (schematic and layout) from one process technology to another process technology and subsequently being reduced in layout area. Here, "scaling" may generally refer to down-sizing layout and devices within same technology node. Here, "scaling" may also generally refer to adjusting (e.g., slowing down or speeding up—e.g., scaling down, or scaling up respectively) of a signal frequency relative to another parameter, for example, power supply level.

Here, terms "substantially," "close," "approximately," "near," and "about," generally refer to being within +/−10% of a target value. For example, unless otherwise specified in explicit context of their use, terms "substantially equal," "about equal," and "approximately equal" mean that there is no more than incidental variation between among things so described. In at least one embodiment, such variation is typically no more than +/−10% of a predetermined target value.

Unless otherwise specified use of ordinal adjectives "first," "second," and "third," etc., to describe a common object, merely indicate that different instances of like objects are being referred to and are not intended to imply that objects so described must be in a given sequence, either temporally, spatially, in ranking, or in any other manner.

Here, "left," "right," "front," "back," "top," "bottom," "over," "under," and like in description and in claims, if any, are used for descriptive purposes and not necessarily for describing permanent relative positions. In at least one embodiment, "over," "under," "front side," "back side," "top," "bottom," "over," "under," and "on" as used herein refer to a relative position of one component, structure, or material with respect to other referenced components, structures, or materials within a device, where such physical relationships are noteworthy. In at least one embodiment, these terms are employed herein for descriptive purposes only and predominantly within context of a device z-axis and therefore may be relative to an orientation of a device. In at least one embodiment, a first material "over" a second material in context of a figure provided herein may also be "under" second material if device is oriented upside-down relative to context of figure provided. In context of materials, one material disposed over or under another may be directly in contact or may have one or more intervening materials. Moreover, one material disposed between two materials may be directly in contact with two layers or may have one or more intervening layers. In at least one embodiment, a first material "on" a second material is in direct contact with that second material. Similar distinctions are to be made in context of component assemblies.

Here, "between" may be employed in context of z-axis, x-axis, or y-axis of a device. In at least one embodiment, a material that is between two other materials may be in contact with one or both of those materials or may be separated from both of other two materials by one or more intervening materials. In at least one embodiment, a material "between" two other materials may therefore be in contact with either of other two materials or may be coupled to other two materials through an intervening material. In at least one embodiment, a device that is between two other devices may be directly connected to one or both of those devices or may be separated from both of other two devices by one or more intervening devices.

Reference in specification to "an embodiment," "one embodiment," "in at least one embodiment," "some embodiments," or "other embodiments" means that a particular feature, structure, or characteristic described in connection with embodiments is included in at least some embodiments, but not necessarily all embodiments. Various appearances of "an embodiment," "one embodiment," "in at least one embodiment," or "some embodiments" are not necessarily all referring to same embodiments. If specification states a component, feature, structure, or characteristic "may," "might," or "could" be included, that particular component, feature, structure, or characteristic is not required to be included. If specification or claim refers to "a" or "an" element, that does not mean there is only one of elements. If specification or claims refer to "an additional" element, that does not preclude there being more than one of additional elements.

Furthermore, particular features, structures, functions, or characteristics may be combined in any suitable manner in one or more embodiments. For example, a first embodiment may be combined with a second embodiment anywhere particular features, structures, functions, or characteristics associated with two embodiments are not mutually exclusive.

While at least one embodiment has been described in conjunction with specific embodiments thereof, many alternatives, modifications, and variations of such embodiments will be apparent to those of ordinary skill in the art considering description herein. At least one embodiment is intended to embrace all such alternatives, modifications, and variations as to fall within broad scope of appended claims.

In addition, well-known power/ground connections to integrated circuit (IC) chips and other components may or may not be shown within presented figures, for simplicity of illustration and discussion, and so as not to obscure any embodiment. Further, arrangements may be shown in block diagram form to avoid obscuring any embodiment, and in view of the fact that specifics with respect to implementation of such block diagram arrangements are highly dependent upon the platform within which an embodiment is to be implemented (e.g., such specifics should be well within purview of one skilled in art). Where specific details (e.g., circuits) are set forth to describe example embodiments of disclosure, it should be apparent to one skilled in art that disclosure can be practiced without, or with variation of these specific details. Description of an embodiment is thus to be regarded as illustrative instead of limiting.

In at least one embodiment, structures described herein can also be described as method(s) of forming those structures or apparatuses, and method(s) of operation of these structures or apparatuses. Following examples are provided that illustrate at least one embodiment. An example can be combined with any other example. As such, at least one embodiment can be combined with at least another embodiment without changing scope of an embodiment.

Example 1 is an apparatus comprising: a resonator structure comprising a first transmission line and first two symmetric ring-shaped stubs with substantially equal width and length, placed substantially in a middle of the first transmission line; and a cross-coupling line structure for induction of crosstalk, the cross-coupling line structure comprising a second transmission line and second two symmetric ring-shaped stubs, wherein the second transmission line is coupled to a DC or pulsed voltage source.

Example 2 is an apparatus according to any example herein, in particular example 1, wherein the first two symmetric ring-shaped stubs or the second two symmetric ring-shaped stubs have one of: hexagonal shape; parabolic shape; rectangular shape; or circular shape.

Example 3 is an apparatus according to any example herein, in particular example 1, wherein the cross-coupling line structure and the resonator structure have similar shape.

Example 4 is an apparatus according to any example herein, in particular example 1, wherein the cross-coupling line structure is above or below the resonator structure.

Example 5 is an apparatus according to any example herein, in particular example 1, wherein a direction of current through the cross-coupling line structure changes an amplitude response and a phase response of the resonator structure.

Example 6 is an apparatus according to any example herein, in particular example 1, wherein an amplitude of a current through the cross-coupling line structure changes an amplitude response and a phase response of the resonator structure.

Example 7 is an apparatus according to any example herein, in particular example 1, wherein the DC or pulsed voltage source is configured to turn on to provide current through the cross-coupling line structure.

Example 8 is an apparatus according to any example herein, in particular example 1, wherein the resonator structure and the cross-coupling line structure are on different metal layers of an integrated circuit metal layer stack.

Example 9 is an apparatus according to any example herein, in particular example 8, wherein the integrated circuit metal layer stack is one of a CMOS, GaAs, BiCMOS, BJT, InSb, or GaN metal layer stack.

Example 10 is an apparatus according to any example herein, in particular example 8, wherein the resonator structure and the cross-coupling line structure are on different metal layers of printed circuit board.

Example 11 is a method comprising: controlling a flow of current via a DC voltage source or a pulsed voltage source; flowing the current through a cross-coupling line structure; inducing crosstalk from the cross-coupling line structure to a resonator structure by flowing of the current; and switching an RF signal between a transmitter and a receiver based on the crosstalk induced in the resonator structure.

Example 12 is a method according to any example herein, in particular example 11, wherein the resonator structure includes a first transmission line and first two symmetric ring-shaped stubs with substantially equal width and length, placed substantially in a middle of the first transmission line.

Example 13 is a method according to any example herein, in particular example 12, wherein the resonator structure is coupled to the cross-coupling line structure, wherein the cross-coupling line structure includes a second transmission line and second two symmetric ring-shaped stubs, wherein the second transmission line is coupled to the DC voltage source or the pulsed voltage source.

Example 14 is a method according to any example herein, in particular example 13, wherein the method includes changing mutual capacitance between the cross-coupling line structure and the resonator structure to create a sharp window in a transmission response when a DC or a pulsed voltage is applied to the cross-coupling line structure via the DC voltage source or the pulsed voltage source.

Example 15 is a method according to any example herein, in particular example 13, wherein the method includes generating an isolation between an on-state response and an off-state response of a time division duplexing switch, which includes the resonator structure and the cross-coupling line structure.

Example 16 is a method according to any example herein, in particular example 15, wherein the method includes coupling the RF signal between an antenna and the transmitter or the receiver via the time division duplexing switch.

Example 17 is a system comprising: a transmitter comprising: a power amplifier to amplify a transmit signal; and a first band pass filter to band limit an output of the power amplifier; a receiver comprising: a second band pass filter to band limit a receive signal; and a low noise amplifier to amplify an output of the second band pass filter; a first time division duplexing switch circuit coupled to the transmitter; a second time division duplexing switch circuit coupled to the receiver; and an antenna coupled to the first and second time division duplexing switch circuits, wherein the first time division duplexing switch circuit comprises: a resonator structure comprising a first transmission line and first two symmetric ring-shaped stubs with substantially equal width and length, placed substantially in a middle of the first transmission line, wherein the antenna is coupled to a first port of the resonator structure, and wherein the first band pass filter is coupled to a second port of the resonator structure; and a cross-coupling line structure for induction of crosstalk, the cross-coupling line structure comprising a second transmission line and second two symmetric ring-shaped stubs, wherein the second transmission line is coupled to a DC or pulsed voltage source.

Example 18 is a system according to any example herein, in particular example 17, wherein the second time division duplexing switch circuit comprises: a resonator structure comprising a first transmission line and first two symmetric ring-shaped stubs with substantially equal width and length, placed substantially in a middle of the first transmission line, wherein the antenna is coupled to a first port of the resonator structure, and wherein the second band pass filter is coupled to a second port of the resonator structure; and a cross-coupling line structure for induction of crosstalk, the cross-coupling line structure comprising a second transmission line and second two symmetric ring-shaped stubs, wherein the second transmission line is coupled to a DC or pulsed voltage source.

Example 19 is a system according to any example herein, in particular example 17, wherein the first two symmetric ring-shaped stubs or the second two symmetric ring-shaped stubs have one of: hexagonal shape; parabolic shape; rectangular shape; or circular shape.

Example 20 is a system according to any example herein, in particular example 18, wherein the cross-coupling line structure and the resonator structure have same shape.

An Abstract is provided that will allow reader to ascertain the nature and the gist of technical disclosure. An Abstract is submitted with an understanding that it will not be used to limit scope or meaning of claims. Following claims are hereby incorporated into detailed description, with each claim standing on its own as a separate embodiment.

We claim:

1. A system comprising:
   a transmitter comprising:
      a power amplifier to amplify a transmit signal; and
      a first band pass filter to band limit an output of the power amplifier;
   a receiver comprising:
      a second band pass filter to band limit a receive signal; and

14 a low noise amplifier to amplify an output of the second band pass filter;
a first time division duplexing switch circuit coupled to the transmitter;
a second time division duplexing switch circuit coupled to the receiver; and
an antenna coupled to the first and second time division duplexing switch circuits, wherein the first time division duplexing switch circuit comprises:
   a resonator structure comprising a first transmission line and first two symmetric ring-shaped stubs with substantially equal width and length, placed substantially in a middle of the first transmission line, wherein the antenna is coupled to a first port of the resonator structure, and wherein the first band pass filter is coupled to a second port of the resonator structure; and
   a cross-coupling line structure for induction of crosstalk, the cross-coupling line structure comprising a second transmission line and second two symmetric ring-shaped stubs, wherein the second transmission line is coupled to a DC or pulsed voltage source.

2. The system of claim 1, wherein the second time division duplexing switch circuit comprises:
   a resonator structure comprising a first transmission line and first two symmetric ring-shaped stubs with substantially equal width and length, placed substantially in a middle of the first transmission line, wherein the antenna is coupled to a first port of the resonator structure, and wherein the second band pass filter is coupled to a second port of the resonator structure; and
   a cross-coupling line structure for induction of crosstalk, the cross-coupling line structure comprising a second transmission line and second two symmetric ring-shaped stubs, wherein the second transmission line is coupled to a DC or pulsed voltage source.

3. The system of claim 2, wherein the cross-coupling line structure and the resonator structure have same shape.

4. The system of claim 1, wherein the first two symmetric ring-shaped stubs or the second two symmetric ring-shaped stubs have one of:
   hexagonal shape;
   parabolic shape;
   rectangular shape; or
   circular shape.

5. An apparatus comprising:
   a resonator structure comprising a first transmission line and first two symmetric ring-shaped stubs with substantially equal width and length, placed substantially in a middle of the first transmission line; and
   a cross-coupling line structure for induction of crosstalk, the cross-coupling line structure comprising a second transmission line and second two symmetric ring-shaped stubs, wherein the second transmission line is coupled to a DC or pulsed voltage source.

6. The apparatus of claim 5, wherein the resonator structure and the cross-coupling line structure are on different metal layers of an integrated circuit metal layer stack.

7. The apparatus of claim 6, wherein the integrated circuit metal layer stack is one of a CMOS, GaAs, BiCMOS, BJT, InSb, or GaN metal layer stack.

8. The apparatus of claim 5, wherein the DC or pulsed voltage source is configured to turn on to provide current through the cross-coupling line structure.

9. The apparatus of claim 5, wherein the first two symmetric ring-shaped stubs or the second two symmetric ring-shaped stubs have one of:

hexagonal shape;
parabolic shape;
rectangular shape; or
circular shape.

10. The apparatus of claim 5, wherein the cross-coupling line structure and the resonator structure have similar shape.

11. The apparatus of claim 5, wherein the cross-coupling line structure is above or below the resonator structure.

12. The apparatus of claim 5, wherein a direction of current through the cross-coupling line structure changes an amplitude response and a phase response of the resonator structure.

13. The apparatus of claim 5, wherein an amplitude of a current through the cross-coupling line structure changes an amplitude response and a phase response of the resonator structure.

14. The apparatus of claim 5, wherein the resonator structure and the cross-coupling line structure are on different metal layers of printed circuit board.

* * * * *